United States Patent
Walker

[15] 3,675,514
[45] July 11, 1972

[54] COMPOSITE POWER APPLYING MEANS

[72] Inventor: Raymond W. Walker, Huntington Beach, Calif.

[73] Assignee: Deep Oil Technology, Inc., Long Beach, Calif.

[22] Filed: Dec. 17, 1970

[21] Appl. No.: 99,030

[52] U.S. Cl. ..................81/57.11, 81/57.22, 173/12
[51] Int. Cl. ........................B25b 17/00, B25b 21/00
[58] Field of Search ............81/57.11, 57.12, 57.13, 57.14, 81/57.22, 57, 58.1; 173/12

[56] References Cited

UNITED STATES PATENTS

| 3,593,408 | 8/1971 | Walker | 29/429 |
| 2,786,379 | 3/1957 | Blackinton | 81/57.13 |
| 2,820,382 | 1/1958 | Smith | 81/57.13 |
| 3,170,523 | 2/1965 | Short | 173/12 |

Primary Examiner—James L. Jones, Jr.
Attorney—Miketta, Glenny, Poms & Smith

[57] ABSTRACT

A composite power applying means to facilitate the making of a pipe connection in which a rotatable collar means is arranged to cause advancement or retraction of a pipe extending through the collar means which has external teeth engageable by cooperable means on said power means. The composite power means normally transmits rotative forces to the collar means, as by a worm gear, and is selectively operable to impart a reciprocal linearly directed force independently of the rotative force against the external teeth on the collar means for the purpose of effectively tightening or loosening a pipe connection under favorable or unfavorable working conditions, such as subsea well installations.

13 Claims, 5 Drawing Figures

PATENTED JUL 11 1972

INVENTOR.
RAYMOND W. WALKER
BY
Miketta, Glenny, Poms & Smith
ATTORNEYS.

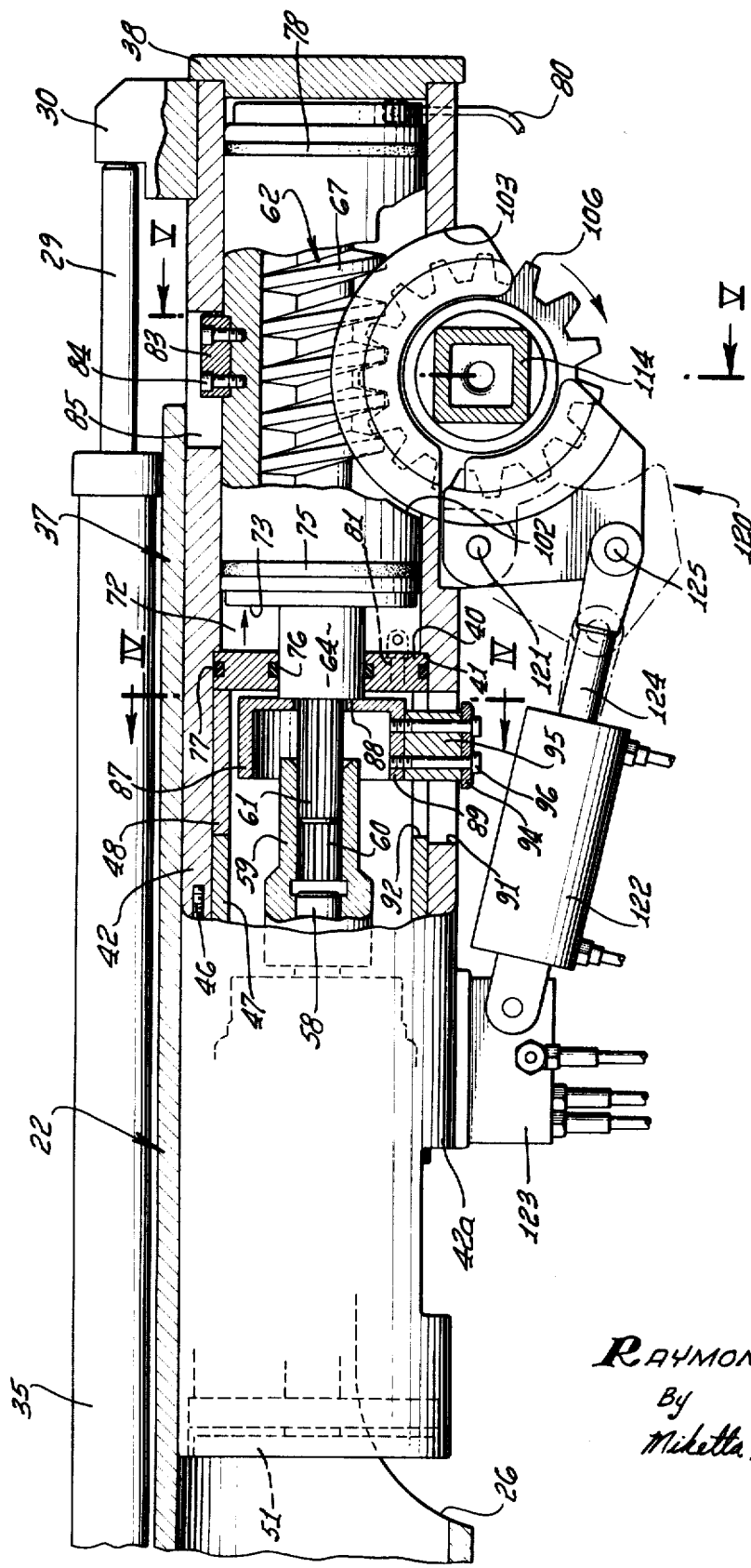

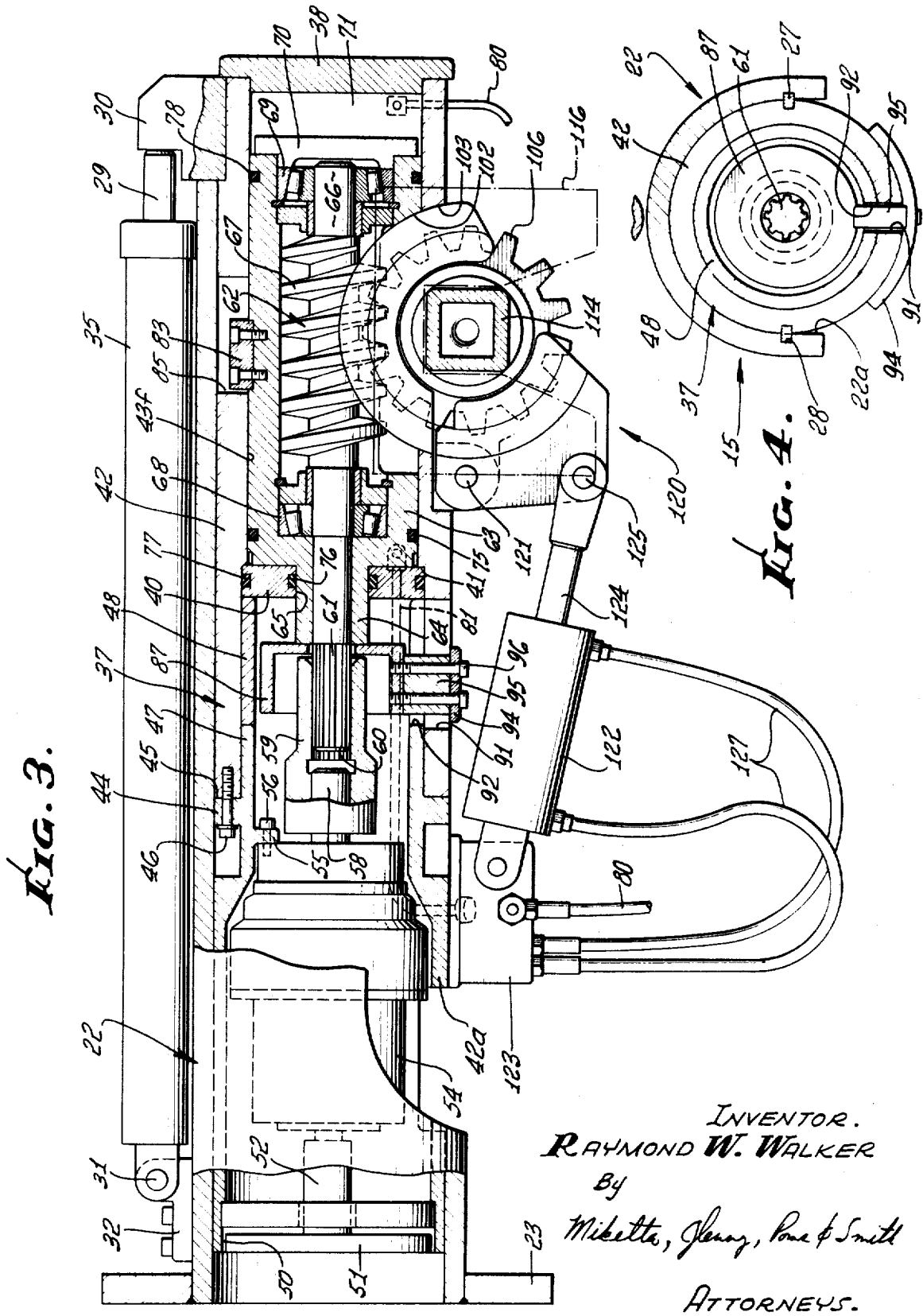

COMPOSITE POWER APPLYING MEANS

RELATED APPLICATION

The subject matter of the present application is a modification and improvement of the power wrench described in application Ser. No. 779,004, filed Nov. 26, 1968, now patent number 3,593,408, and owned by a common assignee.

BACKGROUND OF THE INVENTION

Drilling and production of oil wells located at offshore stations often includes the installation, operation and maintenance of well equipment beneath the surface of the water and at the ocean floor. Underwater conditions, particularly at great depths, impose difficulties on divers and on well equipment during installation and maintenance of the equipment. Submersible work chambers have been provided with external remotely operated power tools whereby well equipment and the making and breaking of necessary pipe connections may be accomplished by such mechanical robot type operating means. Prior proposed power driven tools to make or break a pipe connection have generally included power driven wrenches arranged to approach the connection axially thereof and also power driven tongs in which the tongs were positioned laterally with respect to the connection. In the above-mentioned application, Ser. No. 779,004, a power wrench is described and claimed in which a stationary member is provided with a rotatable worm gear and a movable jaw member closes with said stationary member when a rotatable collar provided with external teeth is positioned in operative engagement with the worm gear for rotation of the collar so as to axially move a pipe end about which the collar is sleeved and provided threaded engagement. The advantages of the power wrench described in said application are included in the advantages of the present invention, the present invention providing improvements in and incorporating new features in a power wrench of such type for facilitating the making and breaking of a pipe connection.

SUMMARY OF THE INVENTION

The present invention relates to a power wrench means for use in subsea conditions wherein a composite power means is provided, wherein a pipe connection may be readily made by applying rotative forces thereto in a manner described in said application and wherein final tightening of the pipe connection may be accomplished by imparting to the rotative part of the connection a linearly laterally directed force which may be imparted thereto. The invention contemplates such a composite power means which is readily movable relative to the pipe connection and which embodies two separate and independently operable sources of power which may be selectively applied to the pipe connection.

Generally speaking, the present invention contemplates a support means fixed to a support member on a submersible work chamber construction, the support member being movable in two dimensions, the support means carrying the composite power wrench means which is movable in a third dimension and thus afforded three-dimensional movement relative to a pipe connection to be made. The composite power wrench means includes means for imparting a rotative force to a rotatable collar on a pipe as by a worm and gear arrangement and also includes means operable independently of the rotative means to impart a linearly or axially reciprocal force on such external gears as by using the worm gear as a rack bar. The invention therefore contemplates a novel composite power means adapted to rapidly and effectively make or break a pipe connection by the provision of an amplified linear force not available in the normal rotative makeup of a rotatable connection.

The main object of the present invention, therefore, is to disclose a novel composite power amplifying wrench or tool useful in installation and maintenance of subsea well equipment.

An object of the invention is to disclose a composite power wrench employing not only rotative driving means, but also linearly acting fluid piston and cylinder means.

Another object of the invention is to disclose and provide such a composite power wrench wherein an amplified or increased force is available to make or break a pipe connection or the like.

A further object of the present invention is to disclose and provide such a composite power means including means for readily positioning the power means in operative engagement with a pipe connecting means.

A still further object of the invention is to disclose such a composite power means including means for imparting rotative movement to a rotatable collar member on a pipe and including means for restraining the pipe against rotation while such a collar member is rotated.

Still another object of the present invention is to disclose and provide means for readily ascertaining and indicating when a preselected torque load has been imposed upon rotative parts of the pipe connection.

Another object of the invention is to disclose and provide such a composite power means wherein the driving means is slidably mounted and wherein the amplitude of the linear force and displacement caused thereby is readily ascertainable.

Various other objects and advantages of the present invention will be readily apparent from the following description of the drawings in which an exemplary embodiment of the invention is shown.

In The Drawings

FIG. 2 is a sectional view taken in a vertical longitudinal plane passing through the axis of the power means and indicated by line II—II of FIG. 1;

FIG. 3 is a enlarged fragmentary sectional view of the power applying means shown in FIG. 1, the view being partly in side elevation and with the piston means retracted;

FIG. 4 is a fragmentary transverse sectional view taken in the plane indicated by line IV—IV of FIG. 2.

Figure 1:
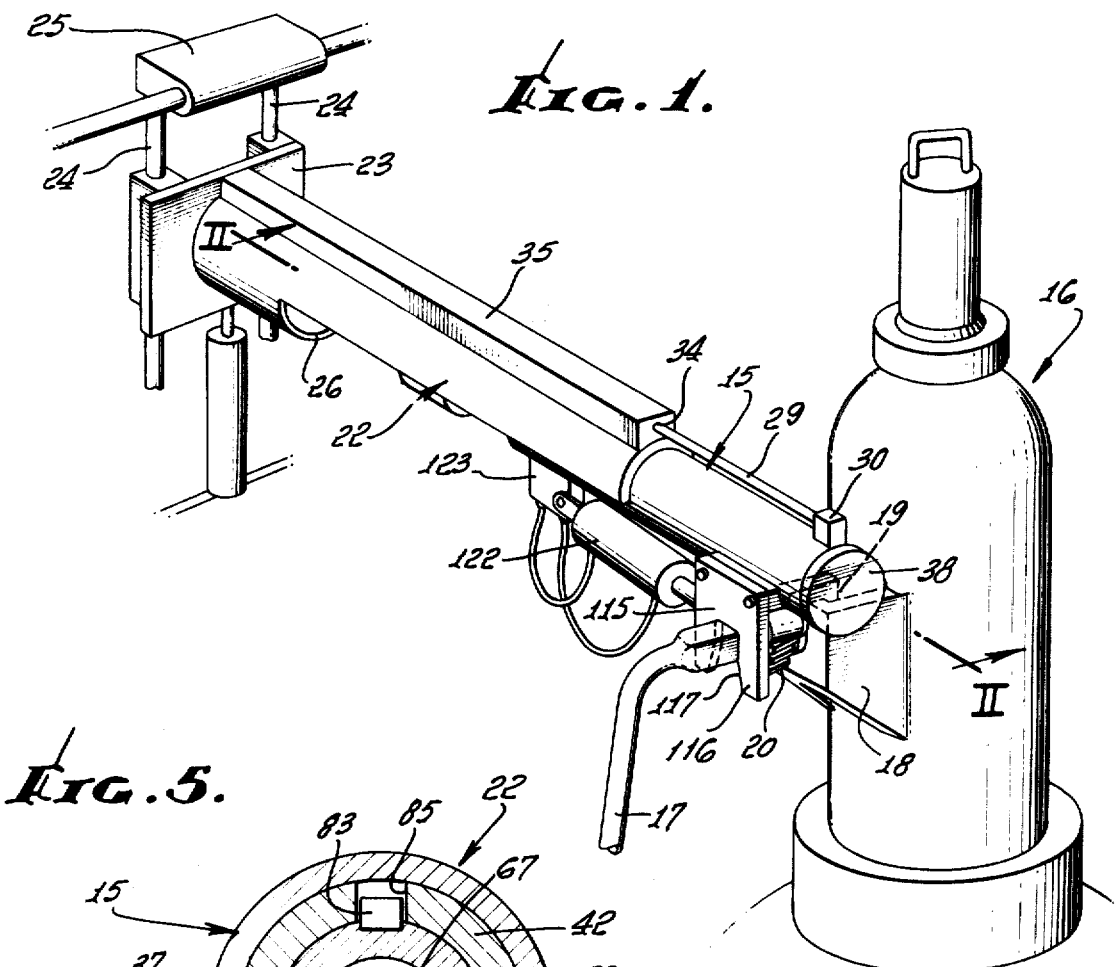
FIG. 1 is a fragmentary perspective view of a composite power applying means embodying this invention, the power means being carried by support means for three-dimensional movement of the power means and shown in working assembly with a pipe connector means at a well unit.

The composite power applying means generally indicated at 15 in FIG. 1 embodies some of the features of construction and operation of my power wrench described and claimed in application for U. S. Letters Patent Ser. No. 779,004 filed Nov. 26, 1968. The power wrench disclosed in said application is adapted to be used with a pipe connector means of the type described and claimed in U. S. Letters Patent No. 3,502,354 issued March 24, 1970.

The power wrench disclosed in my application Ser. No. 779,004 generally comprised a body member which provided at one end a stationary top jaw member positionable over a rotatable collar means on a pipe providing a pipe connection to a well body member as particularly described in said application and in said issued patent. The stationary jaw member supported a worm gear which was adapted to be positioned over and on a pipe connector having external teeth for engagement with the worm gear. The body member pivotally carried a bottom pivotal jaw member which was actuated by a piston means for pivotally swinging the pivotal jaw member into open and closed relation with respect to the stationary jaw and the connector means engaged therewith. The pivoted jaw in closed relation with the stationary jaw held the pipe connector means therebetween for proper engagement with the worm gear. Fluid motor means were provided on the body member for driving the worm gear and suitable hydraulic cylinder means were supported from the body member and connected to the pivotal jaw member for moving the pivotal jaw member between open and closed positions relative to the stationary jaw. Also in said copending application Ser. No. 779,004, the use of a pair of such power wrenches mounted for three-dimensional movement on a submersible work chamber means was also disclosed and claimed, one purpose of such a companion pair of power wrenches being to accurately measure pipe lengths under subsea conditions and to support a cut pipe length so that a connection could be readily made between the ends of a subsea pipe and the pipe connector fitting on a piece of well equipment.

The generally schematic illustration of composite power applying means 15 in FIG. 1 shows a well unit 16 which may be a wellhead, production control unit, or some other type of subsea well equipment which includes a connection to a pipe or conduit 17. Well unit 16 may be provided with a yoke-like receptor bracket 18 having a top opening 19 for receiving and positioning a rotatable pipe connecting means 20 in approximate axial alignment with an opening in well unit 16. One end of pipe 17 and connector means 20 is supported and carried by the adjacent end of power means 15 in a manner hereafter described.

At the opposite end of power means 15, a support arm means 22 telescopically slidably carries power means 15 so that the power means may be reciprocally moved towards and away from a well unit 16. Support arm 22 may be fixed to a support plate 23 which is adjustably movable in a vertical direction along vertical guide rods 24, said guide rods 24 being associated with a cross slide means 25 for transverse horizontal movement of plate 23 and arm 22. Suitable means, not shown, are provided for actuating the support arm 22 so as to properly position power means 15 with respect to the well equipment upon which work is to be performed. Such three-dimensional movement of a power means is described in my said copending application.

Support arm 22 may comprise a cylindrical end portion 26 secured to plate 23 and having a cylindrical portion which merges for the remainder of the length of arm 22 into a semicircular cross sectional portion with a downwardly directed bottom opening 22a. A pair of guide ribs 27 on opposite sides of power means 15 are longitudinally slidable in internal ways or channels 28 provided on inner surfaces of support arm 22 for reciprocal axial movement of the power means. Power means 15 may be driven by a control rod 29 having one end fixed to the front end of power means 15 by a connecting block 30. The opposite end of control rod 29 may be pivotally mounted at 31 to a mounting bracket 32 secured to support arm 22. Rod 29 is slidably movable within a bore 34 provided in an elongated top guide member 35 carried on arm 22. Rod 29 may be reciprocated by suitable ways pressure cylinder means in well-known manner (not shown).

Composite power means 15 carried by support arm 22 may comprise a generally cylindrical housing means 37 having a front end wall 38. Housing means 37 includes a ported partition wall 40 located intermediate ends of the housing means and seated against an annular shoulder 41 provided on the front cylindrical housing portion 42 of the housing means. Partition wall 40 is annular and defines a piston working chamber 43f extending forwardly from wall 40 to end wall 38. Rearwardly of wall 40 housing means 37 includes a rear housing portion 42a provided with an external annular flange 44 seated at 45 against the rear edge wall of front housing portion 42 and secured thereto as by screw bolts 46. The forward end 47 of rear housing portion 42a is spaced from wall 40 by an annular spacer ring 48 which serves to position in pressure engagement wall 40 against shoulder 41. Rear housing portion 42a is provided with an open back end 50 in which is rotatably mounted a circular disc 51 associated by a coupling 52 with a motor shaft of a fluid motor means 54 contained within rear housing portion 42a and secured thereto as by a plurality of spaced mounting lugs 55 and screw bolts 56.

Fluid motor means 54 may be a well-known type of hydraulic or pressure fluid operated motor. Motor 54 includes a front motor shaft end 58 provided with a shaft coupling member 59 rotatable therewith and having a tubular longitudinally splined portion 60 which slidably receives a complementary splined shaft end 61 of a worm gear shaft 66 of a worm gear generally indicated at 62.

Forwardly of wall 40 and extending into front chamber 43 is a hollow elongated piston means 63 provided with an elongated tubular stem 64 which extends through port 65 in wall 40 and which receives shaft 66 which carries splined end 61. Shaft 66 carries a worm gear thread 67 and may be rotatably mounted by spaced bearing means 68 and 69 in the piston means. Opposite end bearing means 69, piston means 63 is provided with a piston end wall 70. Piston end wall 70 defines with the cylinder end wall 38 a front cylinder chamber portion 71.

When the piston means is in extended position as shown in FIG. 2, a rear cylinder chamber portion 72 is defined by partition 40 and rearwardly facing annular surface 73 of piston means 63. Piston means 63 is provided with a seal ring 75 of suitable "O" ring type and partition 40 may be provided with inner and outer seal members 76 and 77 respectively to provide a fluid tight rear cylinder chamber portion 72. Similarly, the front end portion of piston means 63 may be provided with an outer seal ring 78 to seal front chamber portions 71. Pressure fluid may be introduced to chamber portions 71 and 72 by suitable pressure fluid conducting lines 80 and 81 respectively.

Piston means 63 may be held against rotational movement by a key 83 secured to the piston wall by stud bolts 84, key 83 extending into a longitudinal slot 85 provided in the wall of housing portion 42. The length of slot 85 is correlated to the longitudinal travel of the piston means 63 in the cylinder means 37.

It will be understood that such longitudinal travel of the piston means 63 is readily permitted by the splined inter-engagement of splined worm gear shaft end 61 with the internally splined tubular end 60 of coupling 59 as shown in FIGS. 2 and 3.

Means for indicating the longitudinal position of piston means 63 within the cylinder chamber portions 71, 72 may comprise a cup-shaped rearwardly facing member 87 secured to the end face of shaft 64 at 88 and ported to receive splined end 61. A rearwardly facing cylindrical wall 89 of the cup-shaped member supports a spacer block 95 for movement in aligned longitudinally extending openings 91 and 92 in the telescoped walls of the front and rear housing portions 42 and 42a. An arcuate indicator plate 94 is secured to spacer block 95 by screw bolts 96 which extend to and are threaded in wall 89. The arcuate indicator plate 94 extends sufficiently upwardly along the arcuate bottom surface of the front housing portion 42 so as to be readily viewed from a window in a submersible work chamber or other diving structure. The cup-shaped member 87 surrounds and protects the interengaging splines of coupling 59 and shaft end 61 from deposit of foreign particles in the sea water.

Figure 5:
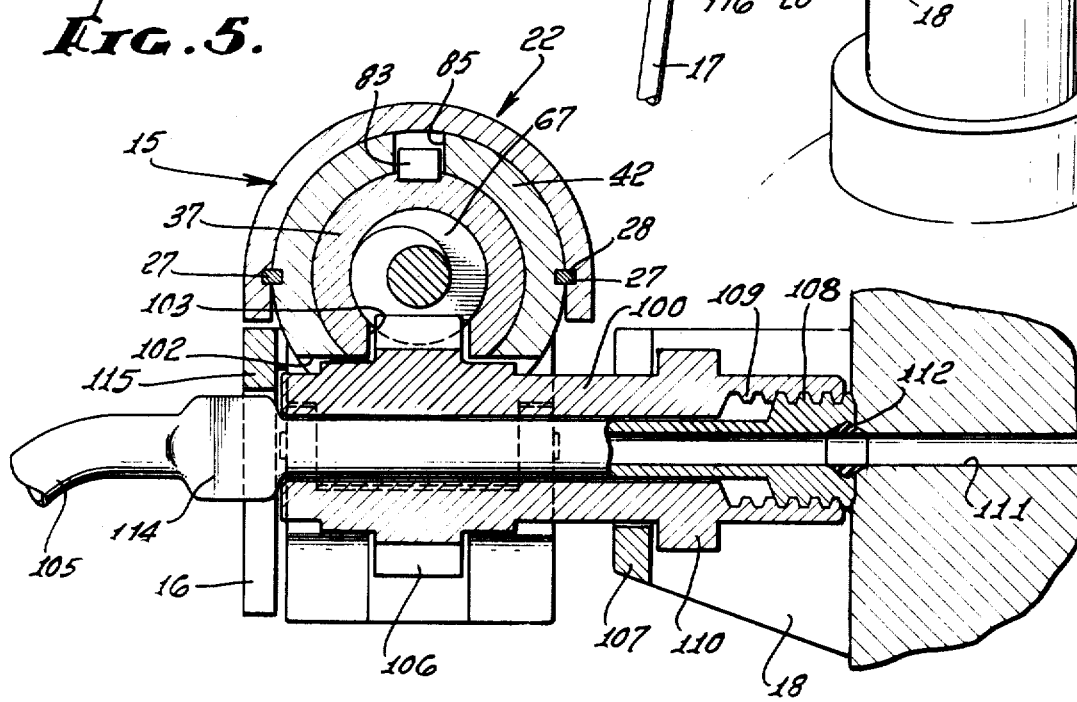
FIG. 5 is a fragmentary transverse sectional view taken in the planes indicated by lines V—V of FIG. 2.

Means permitting engagement of worm gear 62 with a rotatable pipe connecting member 100 is provided by a bottom opening 102 in housing portion 42 and a corresponding aligned opening 103 in the bottom wall portion of piston means 63. The configuration of openings 102 and 103 are best seen in FIG. 5 wherein rotatable member 100 carried by the end of pipe 105 includes a circular toothed portion 106 which extends upwardly into openings 102 and 103 for engagement with worm thread 67 when the rotatable member 100 is positioned and held in the power means 15 in a manner similar to that described in said copending application. Briefly, pipe 105 is provided with an externally threaded end 108 which engages internal threads 109 on rotatable member 100. An annular collar 110 on member 100 locates member 100 with respect to wall 107 of bracket means 18 in approximate alignment with an opening of a bore 111 to be connected in fluid communication with the pipe. The member 100 when rotated relative to pipe 105 by the inter-engagement of the worm gear and toothed portion 106 advances or retracts the pipe 105 for making or breaking a pressure sealed engagement with the bore 111 through a resilient seal means 112.

In this example, means for restraining pipe 105 against rotation may include a flatted or polygonal pipe portion 114 provided a preselected distance from external threaded portion 108 and engageable by a downwardly opening U-shaped yoke plate 115 having depending legs 116 with downwardly and outwardly flared inner edges 117 to facilitate reception of portion 114 between said legs and to non-rotatably engage polygonal portion 114 when fully received within the yoke plate 115. Yoke plate 115 may be rigidly secured by suitable screw bolts to the outer cylindrical wall 42 of the power means 15.

Means for holding the piston means 15 in cooperable relationship with pipe 105 and rotatable member 100 carried thereby may comprise a pivotally mounted jaw member 120 having a construction and mode of operation similar to that described in my copending application. Briefly, jaw member 120 is pivotally mounted on piston means 15 at a pivotal connection 116 and may be actuated by a suitable piston-cylinder means 122 pivoted to a manifold means 123 carried on the bottom of rear housing portion 42a. Cylinder means 122 includes a piston rod 124 having its end pivotally connected at 125 to the movable jaw member 120 at a point spaced below its pivotal connection 121. Thus, when the cylinder means 122 is actuated from an open position, as indicated in FIG. 2 in phantom lines, and after the piston means has been positioned on the rotatable member 100, jaw member 120 will be swung upwardly into holding engagement with rotatable member 100.

Pressure fluid lines 127 are connected to cylinder means 122 to provide a double acting positive operation of piston rod 124, lines 127 being connected to manifold means 123. It may be noted that lines 80 and 81 may also be connected to the manifold means 123. Means for controlling the pressure fluid to operate fluid motor 54, the piston means of the power means 15, and cylinder means 122 are not shown and may be connected with a control system provided in a submersible work chamber in well-known manner.

In operation of power means 15, a pipe connection may be first engaged in yoke plate 115 with jaw member 120 in open position to provide engagement of the worm thread 67 and toothed portion 106 of rotatable member 100. After jaw member 120 is moved to closed holding engagement with the pipe connecting means, the pipe may be lifted by the movement of vertically movable plate 23 on the submersible work chamber and moved horizontally by said plate 23 and by said power means 15 until rotatable member 100 is properly positioned in bracket 18 on well unit 16. Upon positioning of rotatable member 100 in the U-shaped opening in the wall 107 of the bracket, the worm gear 62 may be rotated by fluid motor means 54 so as to drive rotatable member 100 relative to the pipe for advancement of the pipe end toward the recessed opening of bore 111 in the well unit. Rotation of the rotatable member 100 by the worm gear 62 continues until a preselected amount of torque is applied to rotatable member 100. The amount of such torque may be readily indicated to an observer in a submersible work chamber by a pressure gage (not shown) and target indicating means 130 (for example, a surveyor's target) provided on the rotatable disc 51 at the end of support arm 22 to show direction of rotation and speed so that stall torque may be observed.

When a selected amount of torque has been applied to rotatable member 100, it is often desirable to impart additional force to the rotatable member to make the fluid sealed connection between the end of the pipe and bore 111 pressure tight. For this purpose, pressure fluid may be introduced through line 81 into the rear cylinder portion 72 to forceably impart a linearly directed force through worm threads 67, without rotation of the worm gear, to teeth 106 in a manner similar to a rack and gear or pinion arrangement. The magnitude of such linearly directed forces provided by a piston-cylinder arrangement may be much greater than the magnitude of linear components of rotative torque forces applied through rotation of the worm gear. Thus, upon linear movement of the piston means 63 and the worm gear carried thereby and without rotation of the worm gear, a force of selected magnitude may be imparted to rotatable member 100 to provide a tight, leak free pressure seal at the well unit. Upon relief of such cylinder fluid pressure on the power means 15, and withdrawing or opening the jaw member 120, the power means may be disengaged from rotatable member 100.

In subsea operations, rotatable connections often become corroded and difficult to unthread or break. Under such conditions where a rotatable pipe connection or coupling is desired to be broken, it will be apparent that when composite power means 15 of the present invention is properly located on a rotatable member 100 with the worm gear in engagement with the teeth on the rotatable member, that introduction of pressure fluid to the front cylinder portion 71, when the piston means is in extended forward position, will impart a linearly directed force, of greater magnitude than the torque forces, against the piston means and the worm gear carried thereby and which is transmitted to the teeth on the rotatable member 100 to crack or break the pipe joint. Once the connecting parts have been broken or loosened in this manner, the worm gear can be readily rotated to unthread or retract the pipe end from the opening of the bore 111. Composite power means 15 thus not only provides a means for applying a rotative force to the worm gears 62 for rotating a rotatable member forming part of a pipe connection, but, in addition, provides a means to impart a linear directed reciprocal force to said rotatable member of the pipe connection by a piston and cylinder means operable independently of the rotative means. It should be noted that while the rotative and linear force means are operable separately, that the forces are imparted to the rotatable member through a common member, namely, the worm gear shaft which is provided relative axial movement with respect to the motor driving shaft which impart rotative forces to the worm gear. It should also be noted that the piston means 63 operable in the front housing portion provides spaced cylinder chambers which are maintained in sealed relation while space between said chambers is open to sea water to make the connection between the worm gear and the toothed portion of the rotatable member of a pipe connecting means. Thus, the composite power means 15 provides a unique arrangement for application of two different force means to the pipe connecting member under adverse and difficult working conditions, such as occur in subsea well operations.

It will be understood that various modifications and changes may be made in the construction and mode of operation of the composite power means described above in all such changes and modifications coming within the scope of the appended claims there embraced thereby.

I claim:

1. A composite power applying means for selectively independently imparting torque and linearly directed drive forces to a driven member having an axis normal to the axis of the power applying means, the combination of:
   - a housing means having an opening between its ends;
   - a piston means within said housing means and including piston portions spaced from opposite ends of the opening;
   - a rotatable worm gear carried by said piston means between said piston portions and disposed opposite said opening;
   - said opening being adapted to receive a rotatably supported member having teeth for cooperable engagement with said worm gear;
   - said piston means being selectively actuatable to impart an amplified linear directed force with respect to the axis of the piston means against the teeth of said driven member engaged with said worm gear.

2. A power applying means as stated in claim 1 including bearing means carried by said piston means at said piston portions for rotatably supporting said worm gear.

3. A power applying means as stated in claim 1 including
   - a motor means carried by said housing means; and
   - means providing an axially extendable driving connection between said worm gear and said motor means.

4. In a power applying means as stated in claim 1 including means on said housing means and on said piston means for restraining rotation of said piston means while permitting axial movement of the piston means.

5. In a power applying means as stated in claim 1 including means on said housing adjacent said opening therein for restraining rotation of a non-rotatable member which carries said rotatable driven member.

6. In a power wrench for use with a pipe connector means including a rotatable driven means having external gear teeth, said power wrench including a housing means, a jaw member pivotally mounted on said housing means and adapted to be actuated into open and closed relationship with respect to said housing means, the combination comprising:
   a cylinder means provided by said housing means;
   a piston means reciprocally movable within said cylinder means;
   a worm member rotatably supported within said piston means and axially movable therewith;
   said housing means and piston means having corresponding openings therein for reception of the external gear teeth on said rotatable driven means for engagement with said worm member;
   means for rotatably driving said worm member; and
   selective means for reciprocating said piston means and causing said worm member to apply a linearly directed force against said gear teeth whereby said worm member acts as a rack bar.

7. A power wrench as stated in 6 including means for selecting the torque load to be applied to said pipe connector means.

8. A power wrench as stated in claim 6 including visible indicator means on said housing means for designating the position of the piston means within said cylinder means.

9. In a power wrench as stated in claim 6 wherein said cylinder means includes longitudinally spaced cylinder portions; and
   said piston means extends between and is movable within said cylinder portions.

10. In a power wrench as stated in claim 6 including means carried on said housing for restraining rotation of said piston means.

11. In a composite power means facilitating making a pipe connection including a rotatable member under subsea conditions and including a support means provided with movement in one or more dimensions, the combination of:
    a power wrench means movable in another dimension relative to said support means and carried thereby;
    said power wrench means including
    means for applying a rotative force to a rotatable member carried by a pipe end for making a pipe connection; and
    means operable independently of the rotative means to impart a linear directed reciprocal force to said rotatable member.

12. A power means as stated in claim 11 including a member common to both rotative and linear force means for transmitting said forces to said rotatable member.

13. A power means as stated in claim 11 including cylinder means having cylinder portions at opposite ends of said common member.

* * * * *